Sept. 9, 1930.  C. S. CHAPMAN  1,775,511
EXHAUST MANIFOLD
Filed May 14, 1928
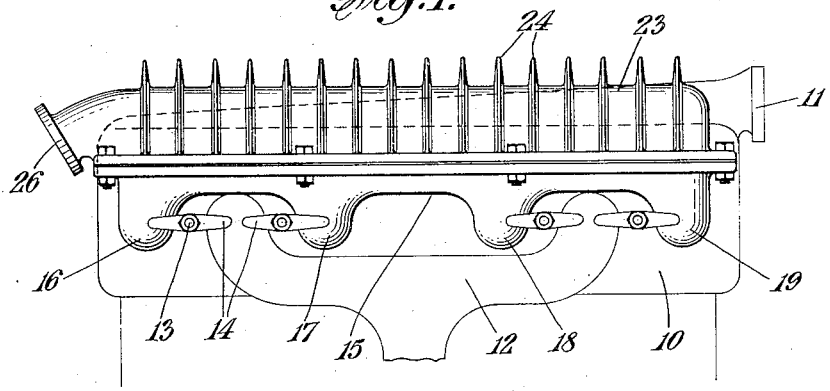
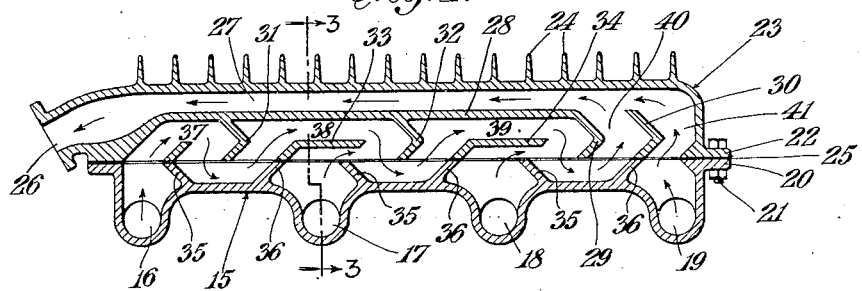
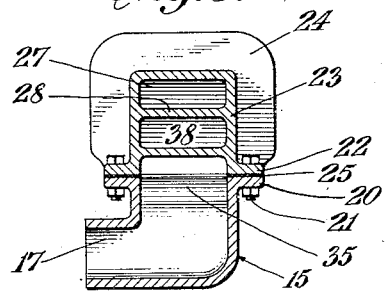
INVENTOR
*Charles S. Chapman*
BY *Warren E. Willis.*
ATTORNEY Patented Sept. 9, 1930

1,775,511

UNITED STATES PATENT OFFICE

CHARLES S. CHAPMAN, OF RIDGEWOOD, NEW JERSEY

EXHAUST MANIFOLD

Application filed May 14, 1928. Serial No. 277,680.

This invention relates to improvements in internal combustion engines and more particularly to types using a plurality of cylinders discharging their exploded gases into an exhaust manifold.

It is an object of the present invention to provide a manifold structure composed of two longitudinal sections permitting separation for cleaning and other purposes.

A further feature is in the provision of means for air cooling the gases in their passage through the manifold, thereby reducing the back pressure and increasing the power of the engine.

Another aim is to produce an exhaust manifold that provides for the initial expansion of the gases, as emitted from the exhaust ports of the engine, materially eliminating the noise of the explosions as well as adding to the efficiency of the engine.

These important advantages are accomplished by the novel design, construction and arrangement of parts, as hereinafter described and shown in the accompanying drawing, forming a material part of this disclosure, and in which:—

Figure 1 is a front elevational view of an embodiment of the invention showing its application.

Figure 2 is a central longitudinal sectional view thereof.

Figure 3 is a transverse sectional view taken on line 3—3 of Figure 2.

A conventional engine block is generally designated by the numeral 10 in the drawing, having a water connection 11 and at the front is an inlet manifold 12, its branches supplying a carburetted mixture to the cylinders.

Bolts 13, set in the block 10, provide means for tightening clamps 14 which are secured to the lower section 15 of an exhaust manifold, this section being provided with down reaching inlets 16, 17, 18 and 19, one for each of the exhaust ports of the cylinders of the engine.

The upper straight flat edge of the lower section has an outwardly extending circumambient flange 20 having openings to receive bolts 21 by which is secured a corresponding flange 22 of the upper section 23 of the exhaust manifold, the same having a series of ribs 24 disposed transversely over its entire area to act as radiators in conducting heat outwardly of the device.

Interposed between the flanges 20—22 is a gasket 25 to prevent escape of gases into the surrounding atmosphere, and at one end of the upper section is a flanged opening 26 to connect with an exhaust pipe.

The upper section 23 contains a straight conduit 27 communicating with the opening 26 and bounded at the bottom by a partition wall 28, terminating in an angular down turned extension 29, a similarly shaped element 30 being spaced therefrom and also from the end wall of the upper section.

Other angular extensions 31 and 32 reach from the partition 28 downwardly, as seen in Figure 2, and spaced below the partition are sub-partitions 33 and 34, their forward ends being turned angularly downward to the level of the flange 22.

Extending upward to the same level from the lower section 15 are a series of divergent partitions arranged in opposed pairs, as at 35—36, the same being arranged in combination with the previously described elements to produce interrupted channels 37, 38, 39, 40 and 41 all of which receive the exhaust from the inlets 16, 17, 18 and 19 in the order of the explosions, these channels being in open communication with the upper channel 27, causing the hot exhaust gases to become sensibly cooled and avoiding much of the noise commonly incident to engine operation.

Although the preferred embodiment of this invention has been described in detail, it is understood that minor changes in construction and details thereof may be made without departing from the spirit or scope of the appended claims.

Having thus described my invention, what I claim as new and desire to secure by Letters Patent, is:—

1. An exhaust manifold comprising a casing having upper and lower sections, inlet ports in the lower section communicating with ducts directed towards one end of the casing, angular baffles in the ducts, a longitudinal partition in the upper section forming a conduit thereabove, baffles below said partition cooperating with the first named baffles to direct gases from said ports, and a discharge opening in the upper section for the conduit, said conduit being in open communication with the ducts at the end opposite the opening.

2. An exhaust manifold comprising a casing having upper and lower sections, inlet ports in the lower section, an exhaust opening in the upper section, a partition forming a conduit in said upper section leading to the exhaust opening, and a series of baffles in both sections cooperating to cause gases from said ports to travel a sinuous course prior to entering the conduit.

3. An exhaust manifold comprising a casing having upper and lower sections, inlet ports in the lower section, an exhaust opening in the upper section, a conduit leading thereto, a duct open to said inlet ports and to said conduit at the end opposite said exhaust opening, a series of angular baffles disposed in said duct to produce a sinuous course therethrough, and a plurality of radiating ribs on the upper section.

4. An exhaust manifold comprising a casing having upper and lower sections, inlet ports in the lower section, an exhaust opening in the upper section, a conduit leading thereto, there being a passage communicating between said ports and with said conduit at the end remote from said exhaust opening, and means adapted to air cool said upper section.

5. An exhaust manifold comprising a casing having upper and lower sections, inlet ports in the lower section, an exhaust opening in the upper section, a conduit leading thereto from said ports, means in said conduit adapted to cause expansion of hot exhaust gases, and means for cooling the gases whereby back pressure and noise is measurably decreased.

In testimony whereof I affix my signature.

CHAS. S. CHAPMAN.